United States Patent [19]

Osaki

[11] Patent Number: 4,839,956
[45] Date of Patent: Jun. 20, 1989

[54] METHOD OF AND APPARATUS FOR ATTACHING TOP STOPS TO SLIDE FASTENER CHAIN

[75] Inventor: Tatsuo Osaki, Uozu, Japan

[73] Assignee: Yoshida Kogyo K. K., Tokyo, Japan

[21] Appl. No.: 184,897

[22] Filed: Apr. 22, 1988

[30] Foreign Application Priority Data

Apr. 25, 1987 [JP] Japan ............................... 62-102811

[51] Int. Cl.⁴ ............................................. B21D 53/50
[52] U.S. Cl. ......................................... 29/408; 29/767
[58] Field of Search ................ 29/408, 766, 767, 33.2

[56] References Cited

U.S. PATENT DOCUMENTS

| 2,523,388 | 9/1950 | Natzke et al. | 29/767 |
| 2,619,148 | 11/1952 | Camp | 29/33.2 |
| 2,701,877 | 2/1955 | Morin | 29/33.2 |
| 3,504,418 | 4/1970 | Perlman | 29/707 |
| 3,588,991 | 6/1971 | Maisenbacher | 29/767 |
| 3,689,980 | 9/1972 | Oyama | 29/767 |
| 4,223,425 | 9/1980 | Akashi | 24/205.11 R |
| 4,368,570 | 1/1983 | Morita | 29/766 |
| 4,624,809 | 11/1986 | Iimura | 264/23 |

FOREIGN PATENT DOCUMENTS 0030707 12/1980 European Pat. Off. .
0141379 10/1984 European Pat. Off. .

Primary Examiner—P. W. Echols

[57] ABSTRACT

In attaching a pair of horizontal U-shaped top stops of synthetic resin to a continuous slide fastener chain, opposed tape edges near a leading one of successive element-free spaces are spread apart, and the top stops are clamped each on its upper and lower surfaces and are placed between the opposed tape edges so as to be horizontally aligned with the opposed inner tape edges. Then the spread inner tape edges are released to restore their original form so as to be inserted through the respective top stops, whereupon only the upper surface of each of the clamped top stops is released from the clamping. Finally the top stops are fused to the opposed tape edges by applying ultrasonic heat energy to the top stops from the released upper surface thereof by an ultrasonic horn.

6 Claims, 7 Drawing Sheets

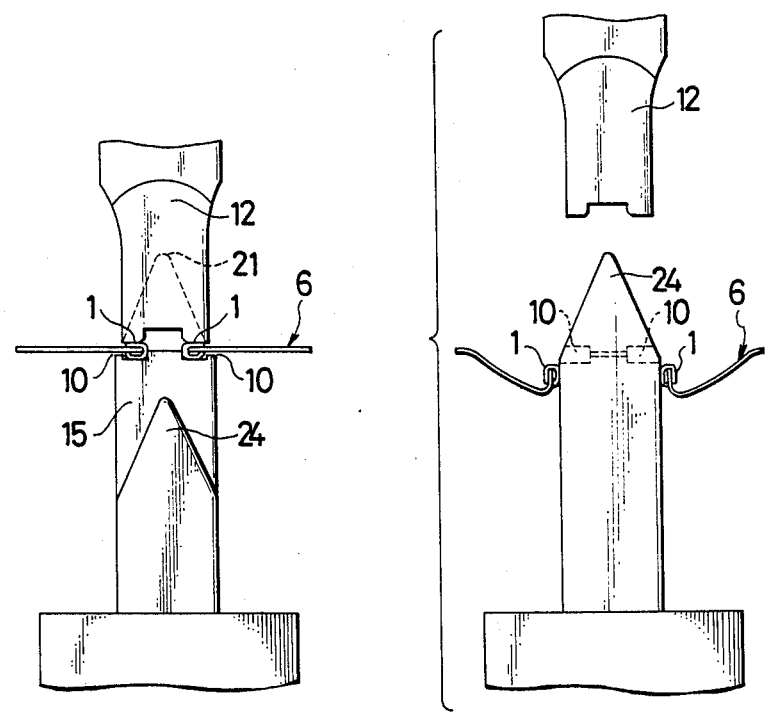

METHOD OF AND APPARATUS FOR ATTACHING TOP STOPS TO SLIDE FASTENER CHAIN

BACKGROUND OF THE INVENTION

1. Field of the Invention

The present invention relates to production of slide fasteners, and more particularly to a method of and apparatus for attaching top stops of synthetic resin to a continuous slide fastener chain.

2. Description of the Prior Art

In the manufacture of slide fasteners, it is known to form a pair of top stops from a synthetic resin film placed on the upper surface of a continuous slide fastener chain and to attach the top stop thereto simultaneously with the forming of the top stops. For this purpose it is known to use a so-called ultrasonic or high-frequency horn which melts the synthetic resin film and shapes the melted synthetic resin into the top stops. As a result the top stops are fused with the respective tape surfaces of the slide fastener chain. However, with this conventional attaching method, it is difficult to attach the top stops to the tape surfaces with adequate firmness. Further, since the tapes of the slide fastener chain are woven or knitted and hence have rough surfaces, burrs would be formed on the top stops while the latter is being shaped.

To this end, a solution has been proposed in which U-shaped top stops are provided from an elongated flat strip of synthetic resin or from an elongated strip of U-shaped cross section, are then placed astride of the respective inner edges of the opposed tapes, are finally fused, by means of an ultrasonic horn, at only inner surface layers of each top stop which are in contact with the tape surfaces. However, this prior method is not automatic and is hence inefficient.

SUMMARY OF THE INVENTION

It is therefore an object of the present invention to provide a method of and apparatus for automatically attaching a pair of U-shaped top stops of synthetic resin to the respective inner longitudinal edges of opposed tapes of a continuous slide fastener chain accurately with adequate firmness.

According to the invention, in a method of attaching a pair of U-shaped top stops of synthetic resin to a tensioned continuous slide fastener chain including a pair of tapes and a pair of coupled rows of fastener elements mounted on and along respective inner longitudinal edges of the opposed tapes, there being a plurality of element-free spaces spaced at equal distances along the slide fastener chain, the improved method comprising the steps of: widening a leading one of the elememt-free spaces by spreading apart the opposed inner tape edges around said one element-free space; clamping the U-shaped top stops each on its upper and lower surfaces and placing the top stops in said one element-free space in such a manner that respective open ends of the U-shaped top stops are aligned with the opposed inner tape edges; releasing the spread inner tape edges to restore their original form so as to be inserted through respective top stops; releasing only the upper surface of each of the clamped top stops from said clamping; and fusing the top stops to the tapes by applying ultrasonic heat energy to the top stops from the released upper surfaces thereof by an ultrasonic horn.

An apparatus for carrying out this method comprises: means for supporting the slide fastener chain in tension along a horizontal path; an anvil and an upper jaw for clamping the top stops each on its upper and lower surfaces, said upper jaw being movable with respect to said anvil so as to release the upper surface of each said top stop, said upper jaw having a substantially triangular head, said anvil and upper jaw being normally disposed below the path of the slide fastener chain and upwardly movable for inserting both said triangular head and triangular upper end into a leading one of the element-free spaces; and a thrusting member normally disposed below the path of the slide fastener chain and upwardly movable upon completion of attaching of the top stops, said thrusting member having a triangular upper end for insertion between the opposed inner tape edges.

Many other objects, features and additional advantages of the present invention will become manifest to those versed in the art upon making reference to the detailed description and the accompanying sheets of drawings in which two preferred embodiments incorporating the principles of the present invention are shown by way of illustrative example.

BRIEF DESCRIPTION OF THE DRAWINGS

FIGS. 8 through 11 illustrate the manner in which a pair of top stops is attached to a continuous slide fastener chain;

DETAILED DESCRIPTION

Figure 12:
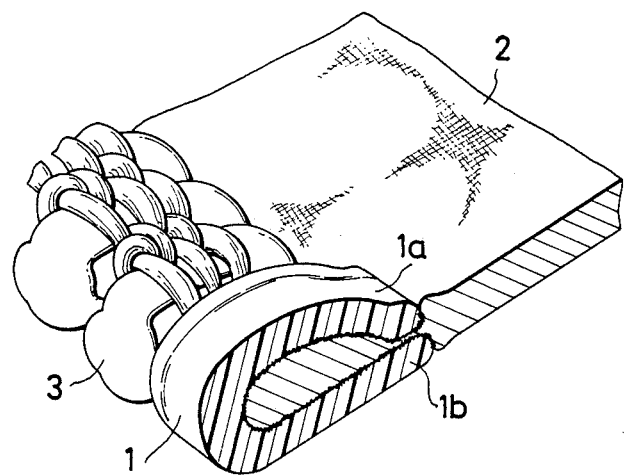
FIG. 12 is a fragmentary perspective view of a slide fastener stringer to which one top stop is attached according to the present invention.
Figure 13:
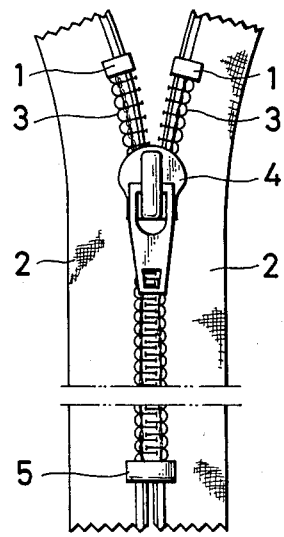
FIG. 13 is a plan view of a slide fastener having a pair of top stops attached to opposed inner tape edges according to the present invention.

FIG. 13 shows a slide fastener including a pair of tapes 2, 2, a pair of rows of fastener elements 3, 3 mounted on and along respective inner longitudinal edges of the opposed tapes 2, 2, and a slider 4 slidably mounted on the pair of rows of fastener elements 3, 3. The slide fastener also includes a bottom stop 5 attached to the tapes 2, 2 at the lower ends of the fastener element rows 3, 3, and a pair of top stops 1, 1 each of which is attached to the respective tape 2 at the upper end of the corresponding fastener element row 3 according to the present invention. FIG. 12 shows the top stop 1 having been attached to the tape 2, in which only the inner surface of the U-shaped top stop 1 is fused and in which opposite (upper and lower) legs 1a, 1b of the top stop 1 bite into the upper and lower surfaces of the tape 2.

The individual top stop 1 to be attached is in the shape of horizontal U which may be provided by bending a predetermined length of blank piece severed from an elongated flat strip of synthetic resin or by severing a predetermined length of blank piece from an elongated synthetic resin strip of U-shaped cross section.

In the manufacture of the slide fastener of FIG. 13, various finishing steps, i.e. the step of threading the slider 4, the step of attaching the bottom stop 5, and the step of attaching the top stops 1, 1, take place in this order while a continuous slide fastener chain 6 is being fed intermittently along a horizontal path in a slide-fastener finishing machine. The slide fastener chain 6 includes a pair of substantially endless-length tapes 2, 2, and a pair of coupled rows of fastener elements 3, 3 mounted on the tapes 2, 2 along respective inner longitudinal edges thereof, there being a plurality of element-free spaces 7 spaced at equal distances along the slide fastener chain 6. Generally, before attaching the top stops 1, 1, the pair of coupled rows of fastener elements 3, 3 is uncoupled along a certain length corresponding to several coupling elements contiguous to the leading one of the element-free spaces 7. Alternatively, this uncoupling may take place simultaneously with the attaching of the top stops 1,1.

According to the method of the present invention, the top stops 1,1 are attached to the slide fastener chain 6 in the following manner:

With the slide fastener chain 6 supported in tension along the horizontal path, the top stops 1, 1 are clamped each on its upper and lower surfaces at a predetermined position below the horizontal path. At that time the open ends of the two top stops 1, 1 face in outward or opposite directions. Then the clamped top stops 1, 1 are raised and at the same time, such opposed inner tape edges are spread apart against the tension of the slide fastener chain 6. When the top stops 1, 1 are then horizontally aligned with the opposed inner tape edges at the uncoupled portion, the spread tapes are released to restore their original form under the tension of the slide fastener chain 6 so that the opposed inner tape edges are inserted through the respective top stops 1, 1. During this inserting, the top stops 1, 1 may be stationary or may be movable toward and away from each other.

Subsequently, the clamped top stops 1, 1 are released each on its upper surface only, whereupon an ultrasonic horn 12 is pressed against the upper surfaces of the top stops 1, 1 to fuse the inner surface layer of each top stop 1, thereby attaching the top stops 1, 1 to the respective tapes 2, 2. With the top stops 1, 1 thus attached, the opposed inner tape edges are again spread apart and then the top stops 1, 1 are removed from the clamping means by lowering the clamping means or by raising the slide fastener chain 6.

Figure 1:
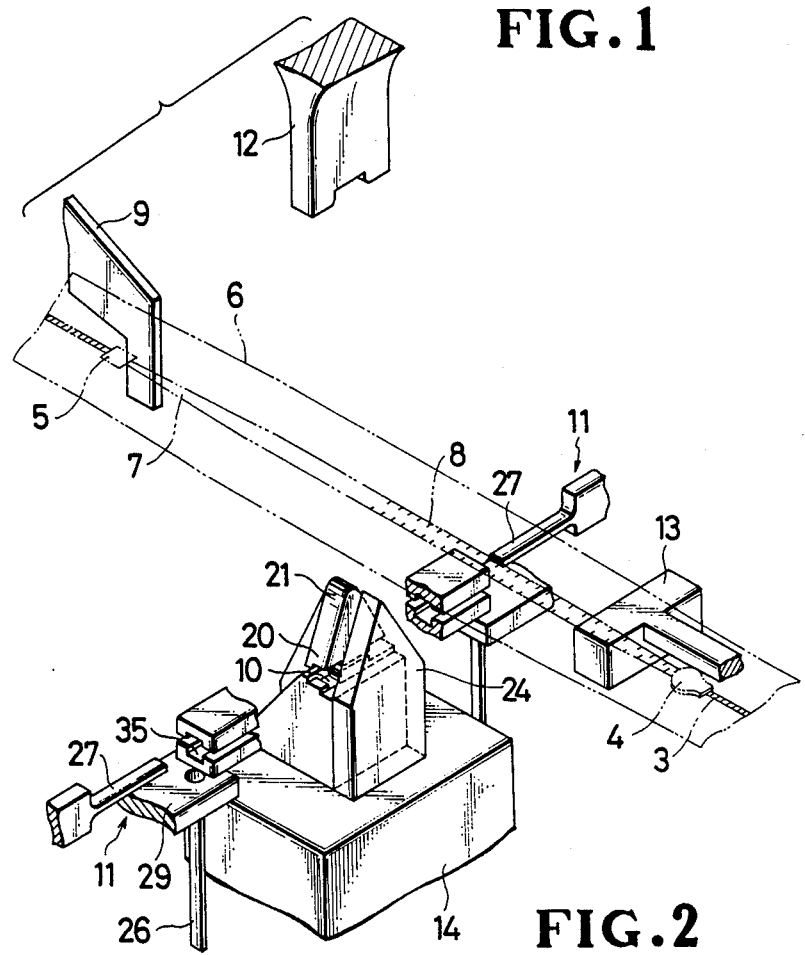
FIG. 1 is a perspective view, with parts broken away, of a top-stop attaching apparatus embodying the present invention.
Figure 3:
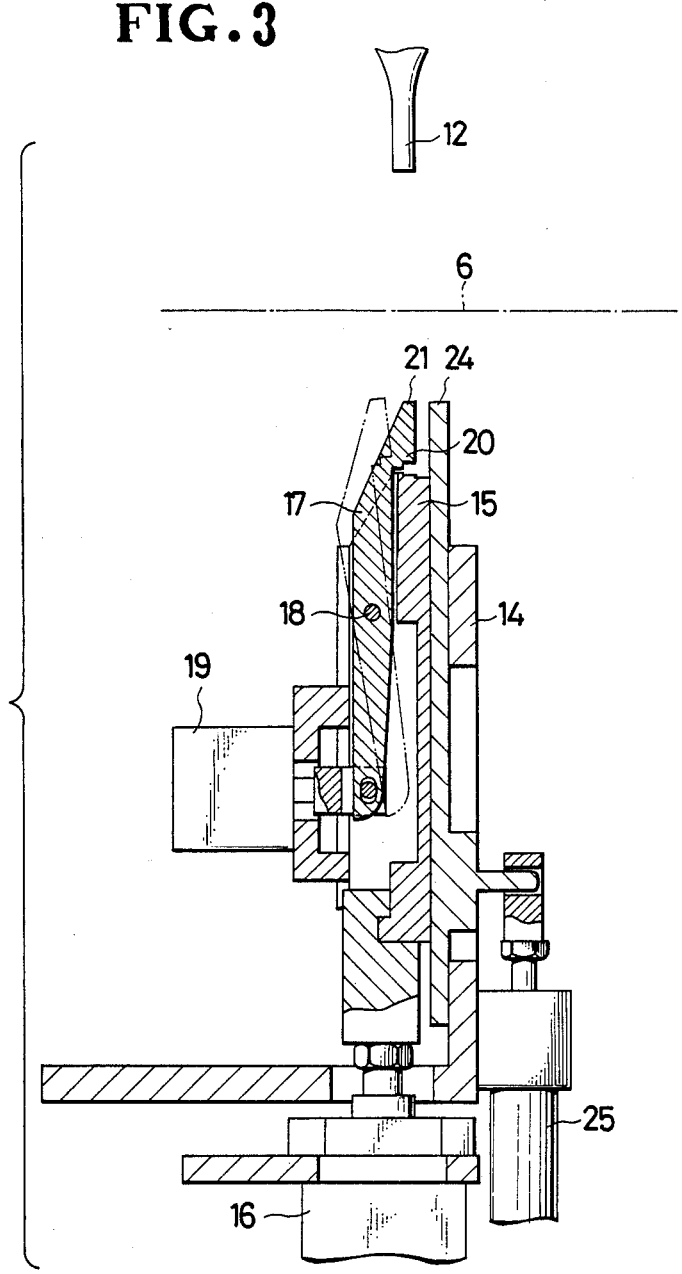
FIG. 3 is a vertical cross-sectional view of the whole of both the anvil and the upper jaw of FIG. 1.
Figure 6:
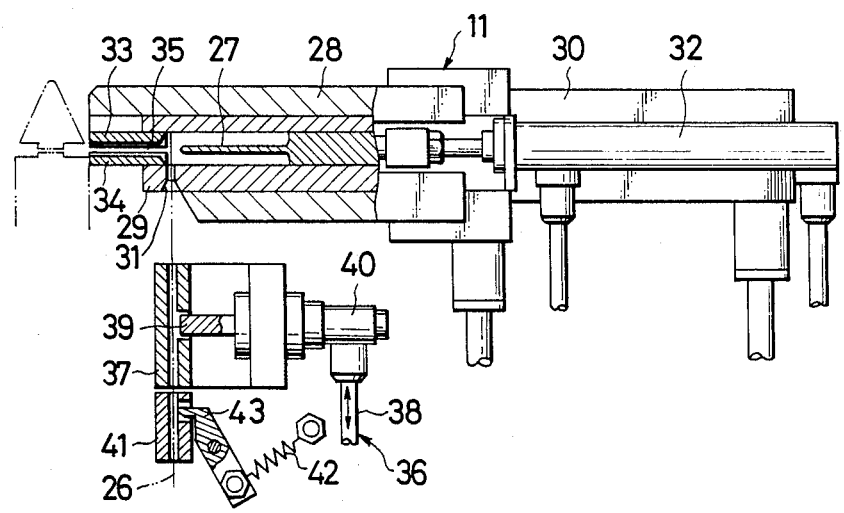
FIG. 6 is a front elevational view, with parts broken away, of a top-stop shaping unit and a blank-strip feeder.

As shown in FIGS. 1, 3 and 6, an apparatus for carrying out the above described method generally comprises a chain feed unit (not shown) for intermittently feeding the slide fastener chain 6 in tension along the horizontal path, a top-stop clamping unit (defining a pair of pockets 10, 10 as described below) normally disposed below the path of the slide fastener chain 6 and vertically movable, a top-stop forming unit 11 disposed below the path of the slide fastener chain 6 for supplying the top stops 1, 1 to the clamping unit, and an ultrasonic horn 12 disposed above the path of the slide fastener chain 6 and vertically movable toward and away from the clamping unit. During the attaching of the top stops 1, 1, the chain feed unit stops feeding the slide fastener chain 7 but keeps it in tension. Designated by 9 is a pulling member which serves to assist in tensioning the slide fastener chain 6. Designated by 13 is a presser member for depressing the slide fastener chain 6 downwardly.

Figure 2:
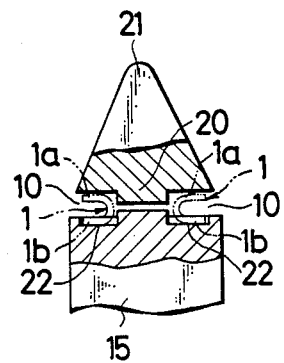
FIG. 2 is an enlarged front view, with parts broken away, of an anvil and an upper jaw, both shown in FIG. 1.

The clamping unit, as best shown in FIG. 3, includes an anvil 15 vertically movably mounted on a base 14 and operatively connected to a vertical first cylinder 16, and a lever 17 pivotally connected at its midportion to the anvil 15 by a pin 18 and also pivotally connected at its lower end to a horizontal second cylinder 19. The anvil 15 has in its top surface a pair of recesses 22, 22 for receiving the respective lower legs 16, 16 of the top stops 1, 1, as shown in FIG. 2. The lever 17 has at its upper portion an overhanging upper jaw 20 for covering the top surface of the anvil 15 so as to define with the recesses 22, 22 the two pockets 10, 10 for receiving the top stops 1, 1 to be attached. The lever 17 also has a triangular head 21 contiguous to the upper jaw 20 for a purpose described below.

As shown in FIG. 3, by the action of the second cylinder 19 the lever 17 is pivotally movable between a clamping position (indicated by solid lines) in which the upper jaw 20 is in vertical alignment with the recesses 22, 22 in the top surface of the anvil 15, and a releasing position (indicated by phantom lines) in which the upper jaw 20 is horizontally displaced from the top surface of the anvil 15.

Figure 4:
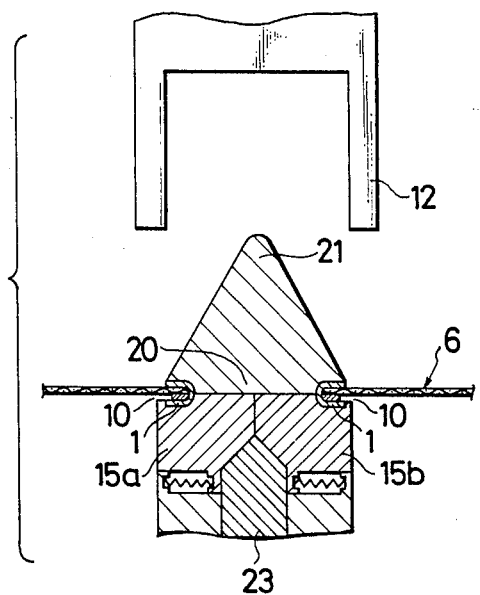
FIG. 4 is a vertical cross-sectional view of a modified form of the anvil and the upper jaw.
Figure 5:
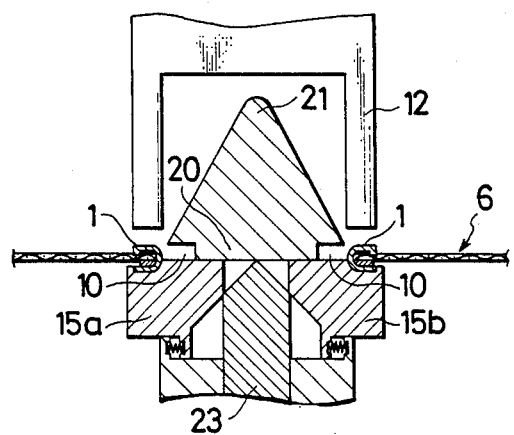
FIG. 5 is a view similar to FIG. 4, showing the manner in which an upper surface of each top stop is released.

FIGS. 4 and 5 illustrate a modified anvil 15 which is horizontally separable. The modified anvil 15 includes a pair of anvil members 15a, 15b movable toward and away from each other, and a vertically movable pusher 23 disposed between the anvil members 15a, 15b. As the pusher 23 is moved upwardly, the two anvil members 15a, 15b are moved away from each other to project horizontally from the upper jaw 20 (FIG. 5), thus releasing the top surfaces of the anvil members 15a, 15b.

As shown in FIGS. 1 and 3, the clamping unit also includes a thrusting member 24 mounted on the base 14 and having at its upper end a triangular head for being parallel to the triangular head 21 of the anvil 15 for insertion between the opposed inner tape edges in response to the upward movement of the thrusting member 24 to remove the top stops (1, 1) out of the pockets (10, 10).

Figure 7:
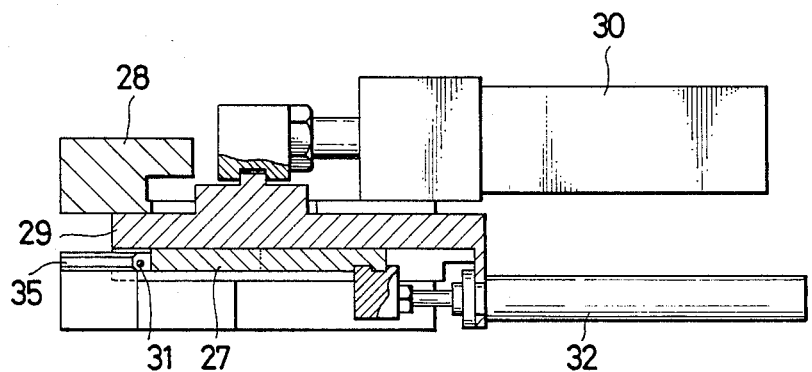
FIG. 7 is a plan view of FIG. 6.

The top-stop forming unit 11, as shown in FIGS. 1, 6 and 7, includes a horizontal casing 28, and a cutter 29 of U-shaped cross section received in the casing 28 and operatively connected at its one end to a fourth cylinder 30. The cutter 29 has a through hole 31 in its front end for the passage of an elongated synthetic resin strip 26. By the action of the fourth cylinder 30, the cutter 29 longitudinally movable through the casing 28 toward and away from the respective pocket 10 of the clamping unit.

A plunger 27 also is inserted in the casing 28 and is operatively connected at one end to a fifth cylinder 32 for longitudinal movement through the casing 28. Supported on the front end of the casing 28 are upper and lower mold members 33, 34 defining therebetween a longitudinal channel 35 in which a top stop blank is to be bent into a U shape.

A feeder 36 is disposed below the cutter 29 and includes a hand 37 through which the elongated flat strip 26 to be inserted and which is operatively connected to a sixth cylinder 38 for vertical movement. In the hand 37, a finger 39 is slidably mounted for holding the elongated flat strip 26 inserted through the hand 37. The finger 39 is operatively connected at its rear end to a seventh cylinder 40 and horizontally movable by the action of the seventh cylinder 40. Designated by 41 is a flat-strip guide disposed at a fixed position below the hand 37 and provided with a pivotable claw piece 43 normally urged by a spring 42 to abut against the flat strip 26.

Figure 8:
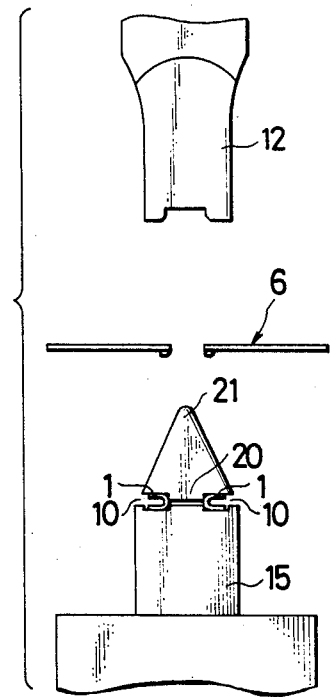

In use, the elongated flat strip 26 is supplied into the through hole 31 of the cutter 29 by the feeder 36, and then the cutter 29 and the plunger 27 are moved forwardly (leftwardly in FIGS. 6 and 7) to sever a predetermined length of flat top stop blank from the elongated flat strip 26. After completion of this cutting, the plunger 27 continues moving forwardly to push the flat top stop blank toward the upper and lower mold members 33, 34. With continued forward moving of the plunger 27, the flat top stop blank is bent into a U shape in the channel 35 defined by the upper and lower mold members 33, 34, and is then delivered to the corresponding pocket 10 of the clamping unit, as shown in FIG. 8.

Figure 9:
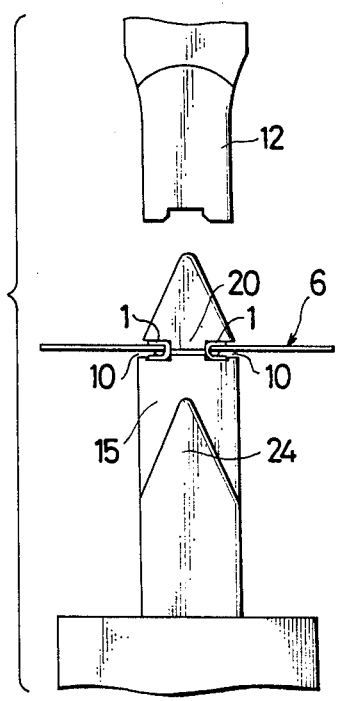

Then the anvil 15 is raised toward the opposed tape edges at the uncoupled portion 8 of the slide fastener chain 6. At that time the triangular head 21 of the lever 17 and the triangular end of the thrusting member 24 spread apart such opposed tape edges. And when the open ends of the top stops 1, 1 received in the respective pockets 10, 10 are brought into horizontally alignment with the opposed tape edges of the uncoupled portion 8 of the slide fastener chain 6, the opposed tape edges are inserted through the respective top stops 1,-1 under the tension of the slide fastener chain 6, as shown in FIG. 9.

Subsequently, the upper jaw 20 is removed away from the top surface of the anvil 15 from the solid-line position to the phantom-line position in FIG. 3 to release only the upper surface of each top stop 1, whereupon the ultrasonic horn 12 is lowered to press the top stops 1, 1, against the top surface of the anvil 15 to thereby fuse the inner surface layers of the top stops 1, 1, as shown in FIG. 12. Thus the top stops 1, 1 have been attached to the opposed tape edges of the slide fastener chain 6.

Upon completion of the attachment of the top stops 1, 1, the ultrasonic horn 12 is returned to its original raised position, and in the meantime, the thrusting member 24 is raised to spread apart such opposed tape edges by the triangular upper end of the thrusting member 24 until the top stops 1, 1 are removed out of the respective recesses 22, 22 in the top surface of the anvil 15 in the opposite directions. Finally the anvil 15 and the thrusting member 24 together are returned to their original lowered position.

According to the present invention, it is possible: to insert the opposed inner tape edges through the respective top stops reliably; to prevent the top stops from being displaced out of their proper clamping position even if the clamping force is released from the upper surfaces of the top stops; and to remove the top stops from the clamping position simply by spreading apart the opposed tape edges after the fusing of the top stops to the opposed tape edges has been completed. Accordingly the present invention is able to meet the requirement of modern industries in which automation is a must for a high rate of production.

Although various minor modifications may be suggested by those versed in the art, it should be understood that I wish to embody within the scope of the patent granted hereon, all such embodiments as reasonably and properly come within the scope of my contribution to the art.

What is claimed is:

1. An apparatus for automatically attaching a pair of horizontal U-shaped top stops of synthetic resin to a continuous slide fastener chain including a pair of tapes and a pair of coupled rows of fastener elements mounted on and along respective inner longitudinal edges of the opposed tapes, there being a plurality of element-free spaces spaced at equal distances along the slide fastener chain, said apparatus comprising:

(a) means for supporting the slide fastener chain in tension along a horizontal path;
   (b) an anvil and an upper jaw for defining a pair of pockets to clamp the top stops each on its upper and lower surfaces, said upper jaw being movable with respect to said anvil so as to release the upper surface of each said top stops, said anvil and said jaw being normally disposed below the path of the slide fastener chain and upwardly movable until said pockets are horizontally aligned with the opposed inner tape edges, said upper jaw having a substantially triangular head for insertion into a space between the opposed inner tape edges in response to the upward movement of said anvil and said upper jaw; and
   (c) a thrusting member normally disposed below the path of the slide fastener chain and upwardly movable upon completion of attaching of the top stops, said thrusting member having a substantially triangular upper end for insertion between the opposed inner tape edges in response to the upward movement of said thrusting member to remove the top stops out of said pockets.

2. An apparatus according to claim 1, in which said anvil has in its top surface a pair of recesses for receiving respective lower legs of the horizontal U-shaped top stops.

3. An apparatus according to claim 2, in which said upper jaw is an overhanging part of a lever pivotally mounted on said anvil.

4. An apparatus according to claim 1, in which said anvil includes a pair of anvil members having said recesses in their respective top surfaces and movable toward and away from each other, and a pusher vertically movably disposed between said anvil members, said anvil members being movable away from each other to project horizontally from said upper jaw in response to the upward movement of said pusher.

5. A method of automatically attaching a pair of U-shaped top stops of synthetic resin to a longitudinally tensioned continuous slide fastener chain including a pair of tapes and a pair of coupled rows of fastener elements mounted on and along respective inner longitudinal edges of the opposed tapes, there being a plurality of element-free spaces spaced at equal distances along the slide fastener chain, said method comprising:

(a) clamping the U-shaped top stops each on its upper and lower surfaces with open ends of the respective U-shaped top stops facing away from each other;
   (b) placing the thus-clamped top stops in a leading one of the element-free spaces in such a manner that the opposite inner tape edges are spread apart around said one element-free space against the tension of the slide fastener chain and then the thus spread tape edges are inserted through the respective U-shaped top stops under the tension of the slide fastener chain when they are aligned respectively with the open ends of the U-shaped top stops;

(c) releasing only the upper surface of each of the top stops from said clamping;

(d) fusing the top stops to the opposed inner tape edges by applying ultrasonic heat energy to the top stops from their released upper side by an ultrasonic horn; and (e) releasing the lower surface of each of the top stops from said clamping.

6. A method according to claim 5, the last-mentioned releasing (e) being achieved by spreading the opposed inner tape edges again around said one element-free space against the tension of the slide fastener chain.

* * * * *